T. DOUGLAS.
REGULATING DEVICE.
APPLICATION FILED APR. 12, 1916.
1,214,286.
Patented Jan. 30, 1917.
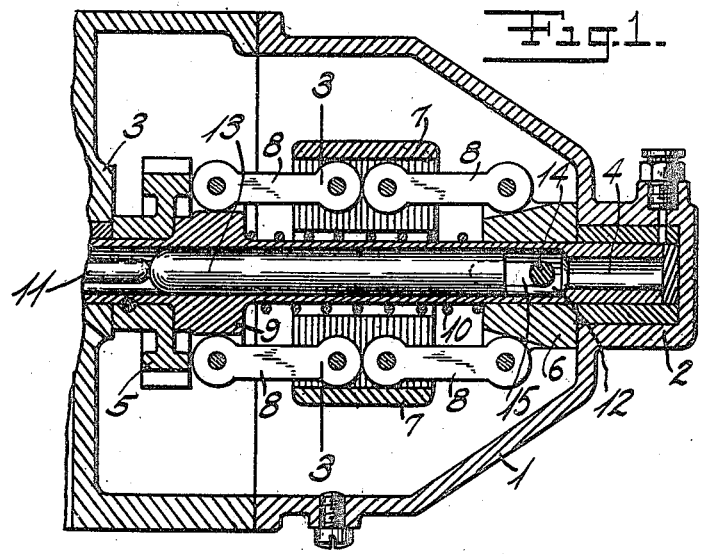
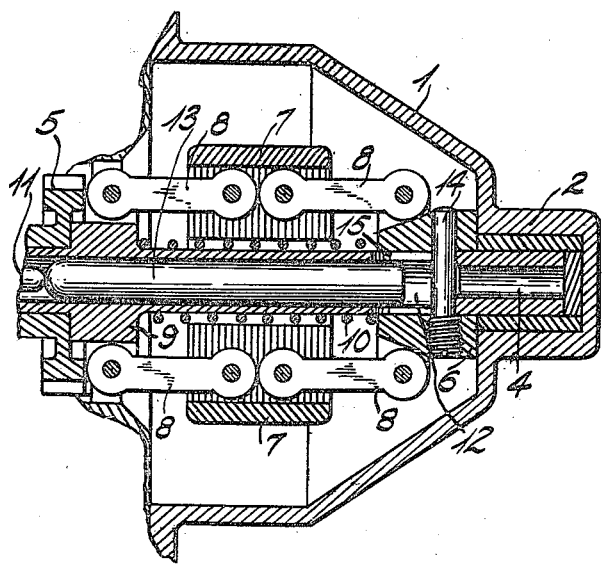
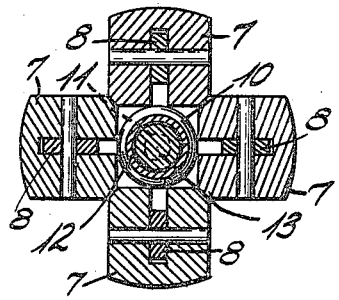
Inventor
THEODORE DOUGLAS
By Attorney
Wm. F. Nickel.

UNITED STATES PATENT OFFICE.

THEODORE DOUGLAS, OF SCARBORO, NEW YORK.

REGULATING DEVICE.

1,214,286.

Specification of Letters Patent.   Patented Jan. 30, 1917.

Application filed April 12, 1916.   Serial No. 90,651.

*To all whom it may concern:*

Be it known that I, THEODORE DOUGLAS, a citizen of the United States, residing at Scarboro, in the county of Westchester and State of New York, have invented certain new and useful Improvements in Regulating Devices, of which the following is a specification.

I have invented an improvement in regulating devices, particularly a governor designed for use mainly upon motor vehicles and other conveyances driven by internal combustion engines; to reduce the quantity of fuel supplied to the engine, and, if need be, cause a suspension of the cycle of operations, in order to avoid exceeding a predetermined speed.

My primary object is to provide a governor which is capable of performing its functions with certainty and efficiency under the conditions usually encountered when the conveyance bearing the governor is in motion; and which cannot be disturbed by jars, shocks and similar occurrences likely to cause vibrations in the body of the conveyance to such an extent as to interfere with its normal and proper mode of operation.

The above and other objects and advantages of my improved governor will appear from the following description, taken in connection with the accompanying drawings which illustrate the best form of my invention now known to me. The disclosure herein is of course to be construed as explanatory only; and other embodiments of the principle of my invention, comprising variations in the shape, size and arrangements of the parts actually shown and described may be made, to the full extent indicated by the generic meanings of the terms in which the claims appended hereto are expressed.

On the drawings, Figure 1 is a vertical longitudinal section through a governor constructed according to my invention; Fig. 2 is a horizontal longitudinal section of the same; and Fig. 3 is a transverse section on the line 3—3 of Fig. 1.

The same numerals of reference are employed to identify the same parts throughout.

In the manufacture of motor vehicles, and particularly commercial trucks, certain principles of construction must be followed in order to enable the load to be carried in the best possible fashion; and especially to secure the flexibility of support required to avoid breakage when obstacles are encountered in the roadway. The practice in this respect, while securing the desired result, is open to the objection that the relative movement permitted between the axles and the chassis bearing the engine and the body of the vehicle entails vibrations that seriously interfere with the regulation of the engine. My invention aims to overcome such drawbacks by means of a construction that will always insure proper operation, and automatically compensate for influences, other than pure speed factors, by which the engine governor might be affected.

In the detailed account of my invention following, the numeral 1 indicates a suitable casing, having at one end a bearing 2, and opposite this bearing, another bearing 3; the two bearings mounting a rotatable shaft 4. This shaft may be driven by a gear 5 thereon adjacent to the bearing 3; and in proximity to the bearing 2, it carries a speed responsive element in the form of a collar 6, adapted to rotate with the shaft 4; but able to slide axially along the shaft a prescribed distance. This collar is connected to a plurality of centrifugal weights 7, by links 8; and similar links join these weights to a fixed collar 9 on the shaft, beside the gear 5. A spring 10 encircles the shaft between the collars 6 and 9, and normally holds the links about in alinement, and the weights close in to the shaft. The governor comprising the parts mentioned is arranged to actuate an element, such as a rod 11, alined with and extending into the shaft 4, and connected to a suitable valve, not shown, in the intake of the engine; so that, when a given speed is reached, the valve in question will be moved to reduce and then interrupt the fuel supply, as is well understood.

I preferably make the shaft 4 with a hollow bore 12 therein; and inside the same and between the collar 6 and the rod 11 I dispose a "floating" member in the form of a pin 13. This pin will be freely movable in the bore 12; but the hollow shaft will engage frictionally with it, besides carrying it; and the pin, further, will be of sufficient mass to have considerable inertia. Normally one end of this pin will abut against the rod 11. At its other end it will be in position to be engaged by a projection on the collar 6, in the form of a bolt or screw 14; extending through the shaft 4, which will have longitudinal slots 15 in its sides to receive the screw. The adjacent end of the pin will be spaced from the screw 14, so that the weights 7 must move the collar 6 toward the collar 9 and compress the spring 10 to some extent before the bolt 14 can move the pin 13.

In operation, the engine will operate without causing the governor to move the pin 13, up to a predetermined maximum speed of rotation. As the maximum speed is reached, the weights will act to cause the collar 6 to compress the spring 10 and moves the screw 14 into engagement with the pin 13. This pin will then transmit motion from the collar 6 to the rod 11 to actuate the same; and the valve to which the rod 11 is connected will consequently be partly closed to reduce the quantity of combustible fluid supplied to the engine on each suction stroke. If the maximum speed is exceeded, the pin 13 will be moved further and the valve will be closed to shut off the fuel entirely.

The governor will normally operate in this way; but if the vehicle encounters a rough stretch of roadway, presenting obstacles to its progress, the jolts given to the wheels will produce vibrations in the body; especially when a load is on the vehicle. Such conditions will derange the function of the governor; and if the body should vibrate enough to impose its period or rhythm upon the governor, control of the engine thereby would then become impossible. With my device, the pin 13 prevents any such disturbance of the governor, because the weights 7 must first move the collar to carry the bolt 14 against the adjacent end of the pin; and then sufficient additional thrust must be applied to overcome the inertia of the member 13 and the friction produced by its contact with the inside of the shaft 4, before the rod 11 can be actuated. Hence ordinary fluctuations in the operation of the governor, arising from jars or shocks, will be suppressed, and outside influences will be counteracted. The governor, then, will move the rod 11 with a force due solely to the speed of rotation of the shaft 4.

The merits of my invention will now be appreciated. Owing to the features above set forth, my governor is not only efficient but also certain in its effects; and the liability of interference with its proper working is reduced to a minimum. At the same time, the construction is quite simple.

The member 13 may of course revolve with the shaft 4, and one of its ends is rounded, as shown, so as to have just a point contact with the rod 11, which moves axially only and does not revolve. The rotating shaft 4, constituting as it does, means for frictionally engaging the member 13, not only applies the centrifugal force to the weights 7, and thus direct-causes the actuation of the rod 11; but also in a measure prevents the actuation of this rod in the wrong manner; and thus coöperates with the member in the attainment of the ends sought after.

The objects of my invention will also be obtained if the pin 13 should ever be moved out of contact with the rod 11. In such a case, the screw 14 might be more easily moved into engagement with the pin 13, but the total force due to inertia and friction to be overcome before the pin 13 can exert a thrust on the rod 11 will be the same. Usually, however, the pin 13 will occupy the relative position shown; since the rod 11, when the pressure of the screw 14 on the pin 13 is removed, will merely push the pin ahead of it as it returns, without making it follow up the screw 14. The member 13 may be regarded as a loose buffer, operatively disposed between the speed responsive element 6 and the element 11; but disconnected from at least one of these elements, and preferably from both; since it serves to absorb impulses which must not be allowed to reach the element 11.

Of course, the manner in which the shaft 4 is driven is not material. The gear 5 may be dispensed with, and the end of the bearing 2 made so that it will be open, to enable a rotating member to be inserted into the casing, and connected to the adjacent end of the shaft 4, if desired.

Under practical conditions the rod 11 will ordinarily be connected to a valve of the grid type having a number of parallel slots forming ports or openings, and requiring but a slight degree of movement to carry it from open to closed position. Hence the importance of the elimination of the effect of vibrations in governor action.

Of course the mass of the member 13 may be decreased to lessen the inertia, and the frictional engagement of the member with the inside of the shaft may be increased by suitable mechanical means, such as a spring or other yielding element carried by either the shaft or the pin 13, and engaging the other. Such an expedient may be employed, too, without decreasing the mass of the member 13.

This member 13 may further be located elsewhere than inside the shaft 4, as the resistance due to the inertia of the member 13, and its frictional engagement with the part carrying it, may be anywhere in the line of thrust of the pin 14.

Having described my invention, what I believe to be new and desire to secure and protect by Letters Patent of the United States is:—

1. A regulating device comprising a speed-responsive element, an element to be actuated thereby, a member mounted in operative relation to said element to be actuated and adapted to be engaged by the speed-responsive element under certain conditions, and means for frictionally engaging said member to oppose the motion thereof.

2. A regulating device comprising a speed-responsive element, an element to be actuated thereby, and a buffer member to control the actuation of said last-named element by the speed-responsive element, whereby fluctuations in the action of said speed-responsive element may be suppressed, the buffer member being disconnected from one of said elements.

3. A governor having a speed-responsive element, a member to transmit motion therefrom, and means for carrying said member, said means having sufficient frictional engagement with the member, and the member having sufficient inertia to prevent derangement of the function of the governor.

4. A regulating device comprising a speed-responsive element, an element to be actuated thereby, and a member having considerable mass movably mounted between said elements, to transmit motion from one element to the other.

5. A regulating device comprising a speed-responsive element, an element to be actuated thereby, and a member having considerable mass movably mounted in operative relation to said element to be actuated, and adapted to be engaged by the speed-responsive element under certain conditions.

6. A speed regulating device comprising a speed-responsive element, a rod to be actuated thereby, and a loose pin of considerable mass between the rod and the element, to transmit motion from said element to said rod.

7. A speed regulating device comprising a speed-responsive element, a hollow shaft carrying the same, a rod alined with the shaft to be actuated by said element, and a pin of considerable mass disposed in said shaft, to abut said rod and be operated by said element.

8. A speed regulating device comprising a collar, a hollow shaft carrying the collar, centrifugal means for controlling the collar, a rod alined with the shaft, a loose pin of considerable mass, frictionally disposed in the shaft, said shaft having a slot, and a device attached to the collar and projecting through the slot to engage the pin when a certain speed has been reached.

In testimony whereof, I have signed my name to this specification this 10th day of April, 1916.

THEODORE DOUGLAS.